(12) United States Patent
Caliksan et al.

(10) Patent No.: US 8,350,815 B2
(45) Date of Patent: Jan. 8, 2013

(54) PORTABLE COMMUNICATION DEVICE INCLUDING TOUCH INPUT WITH SCROLLING FUNCTION

(75) Inventors: Turan Caliksan, Malmo (SE); Aleksander Rodzevski, Malmo (SE)

(73) Assignee: Sony Mobile Communications, Lund (SE)

(*) Notice: Subject to any disclaimer, the term of this patent is extended or adjusted under 35 U.S.C. 154(b) by 1404 days.

(21) Appl. No.: 11/950,118

(22) Filed: Dec. 4, 2007

(65) Prior Publication Data
US 2008/0316178 A1  Dec. 25, 2008

Related U.S. Application Data

(60) Provisional application No. 60/945,207, filed on Jun. 20, 2007.

(51) Int. Cl.
*G06F 3/041* (2006.01)
(52) U.S. Cl. ...... 345/173; 345/169; 345/204; 178/18.01
(58) Field of Classification Search .................. 345/156, 345/168, 169, 173, 204; 178/18.01; 715/863, 715/864
See application file for complete search history.

(56) References Cited

U.S. PATENT DOCUMENTS

| | | | |
|---|---|---|---|
| 4,566,001 A | 1/1986 | Moore et al. | |
| 6,278,888 B1 | 8/2001 | Hayes et al. | |
| 7,653,883 B2 * | 1/2010 | Hotelling et al. | 715/863 |
| 8,144,125 B2 * | 3/2012 | Peng et al. | 345/173 |
| 2003/0090474 A1 | 5/2003 | Schaefer | |
| 2003/0142081 A1 | 7/2003 | Iizuka et al. | |
| 2004/0125087 A1 | 7/2004 | Taylor et al. | |
| 2005/0110768 A1 | 5/2005 | Marriott et al. | |
| 2006/0077176 A1 | 4/2006 | Joung et al. | |
| 2007/0103450 A1 | 5/2007 | Tang et al. | |
| 2007/0120828 A1 | 5/2007 | Fyke | |
| 2008/0036743 A1 * | 2/2008 | Westerman et al. | 345/173 |
| 2008/0062140 A1 * | 3/2008 | Hotelling et al. | 345/173 |

FOREIGN PATENT DOCUMENTS
JP  2004-318362  11/2004

OTHER PUBLICATIONS

International Preliminary Report on Patentability for International Application No. PCT/IB2007/003821 dated Jun. 26, 2009.
International Search Report and Written Opinion for International Application No. PCT/IB2007/003821 dated Aug. 29, 2008.

* cited by examiner

*Primary Examiner* — Joe H Cheng
(74) *Attorney, Agent, or Firm* — Renner, Otto, Boisselle & Sklar, LLP

(57) ABSTRACT

A portable communication device is equipped with a touch input device configured to provide key press functionality and scrolling functionality. The touch input device is electronically defined to include a plurality of key press areas separated by grey zones. The portable communication device is configured to provide scrolling functionality in response to detection of sequential user contact with multiple key press areas and an intervening grey zone within a predetermined timing trigger.

16 Claims, 4 Drawing Sheets

PORTABLE COMMUNICATION DEVICE INCLUDING TOUCH INPUT WITH SCROLLING FUNCTION

RELATED APPLICATION DATA

The present application claims the benefit of U.S. Provisional Application Ser. No. 60/945,207, filed Jun. 20, 2007, the disclosure of which is herein incorporated by reference in its entirety.

TECHNICAL FIELD OF THE INVENTION

The present invention relates generally to portable communication devices, and more particularly, to a portable communication device having a touch input device with key press and scrolling functionality and a method for controlling scrolling.

DESCRIPTION OF RELATED ART

In recent years, portable communication devices, such as mobile phones, personal digital assistants, mobile terminals, etc., continue to grow in popularity. As the popularity of portable communication devices continues to grow, the applications for and features of portable communication devices continues to expand. Portable communication devices are appealing to users because of their capability to serve as powerful communication, data service and entertainment tools.

Portable communication device typically include a keypad having numerical keys and function keys. A user typically will enter a telephone number via the numerical keys, and initiate a call by activating a "send" key. A user typically will end a call by activating a designated "call end" key that functions to "hang up" the call. Various other functional and/or navigational keys may be provided, such as joystick or rocker keys for carrying out various functions related to display manipulation and application launching, e.g., web browsing, playing media and the like.

SUMMARY

In view of the foregoing, a need exists for a portable communication device having improved functional and/or navigation keys. The present invention provides a portable communication device having a touch input device with touch key and scrolling functionality. The touch input device is configured with grey zones separating adjacent key press detect areas, and is capable of operating with existing control mechanisms such that touch input device hardware benefits may be realized with existing coding of key press events.

One aspect of the invention relates to a portable communication device that includes a housing, a display disposed within the housing, and at least one touch input device disposed within the housing, the touch input device being operatively coupled to touch input device control circuitry. The touch input device control circuitry is configured to detect a key press in a first key press area of the touch key input device, detect a key release in the first key press area; detect a key press in a second key press area adjacent to the first key press area, and transmit a scroll command if the key press in the second key press area is detected within a predetermined period of time relative to the key release in the first key press area.

According to another aspect, the touch input device is a touch strip.

According to another aspect, the touch input device control circuitry cooperates with the touch input device to define at least a first key press area and a second key press area on the touch key input device, wherein the first and second key press areas are separated by a grey zone.

According to another aspect, the touch input device control circuitry cooperates with the touch input device to define a first key press area, a second key press area and a third key press area on the touch key input device, wherein the first and second key press areas are separated by a first grey zone and the second and third key press areas are separated by a second grey zone.

According to another aspect, the touch input device control circuitry is configured to detect a key release in the first key press area by detecting contact relative to a grey zone adjacent the first key press area.

According to another aspect, the touch input device control circuitry is configured to detect a key press in a second key press area by detecting contact relative to the second key press area adjacent the grey zone.

According to another aspect, the scroll command is operative to effect scrolling of an image on the display in a direction dependent on the position of the second key press area relative to the first key press area.

According to another aspect, if the second key press area is disposed vertically above the first key press area, then the scroll command is operative to effect upward scrolling of the display.

According to another aspect, if the second key press area is disposed vertically below the first key press area, then the scroll command is operative to effect downward scrolling of the display.

According to another aspect, if the second key press area is disposed right of the first key press area, then the scroll command is operative to effect scrolling of the display to the right.

According to another aspect, if the second key press area is disposed left of the first key press area, then the scroll command is operative to effect scrolling of the display to the left.

According to another aspect, the touch input device is disposed on a front surface of the housing.

According to another aspect, the touch input device is a strip disposed on a side surface of the housing.

According to another aspect, the portable communication device is a mobile telephone.

Another aspect of the invention relates to a method of scrolling a display on a portable communication device that includes detecting contact relative to a touch input device in a first key press area of the touch input device, detecting a release of contact in the first key press area, detecting contact relative to the touch input device in a second key press area adjacent to the first key press area, and scrolling the display in a direction based on the relative position of the first key press area and the second key press area if contact with the second key press area is detected within a predetermined time relative to detecting release in the first key press area.

According to another aspect, the method includes transmitting a first key press event command in response to detecting contact relative to a touch input device in a first key press area of the touch input device, and transmitting a first key release event command in response to detecting a release of contact in the first key press area.

According to another aspect, the method includes transmitting a second key press event command in response to detecting contact relative to the touch input device in a second key press area adjacent to the first key press area, and transmitting a scroll command if detecting contact relative to the touch input device in the second key press area occurs within a predetermined time relative to detecting a release in the first key press area.

According to another aspect, the touch input device is electronically segmented to include at least a first key press area and a second key press area on the touch key input device, wherein the first and second key press areas are separated by a grey zone; and detecting a release of contact in the first key press area includes detecting contact relative to the touch input device in the grey zone of the touch input device.

According to another aspect, the portable communication device is a mobile telephone.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
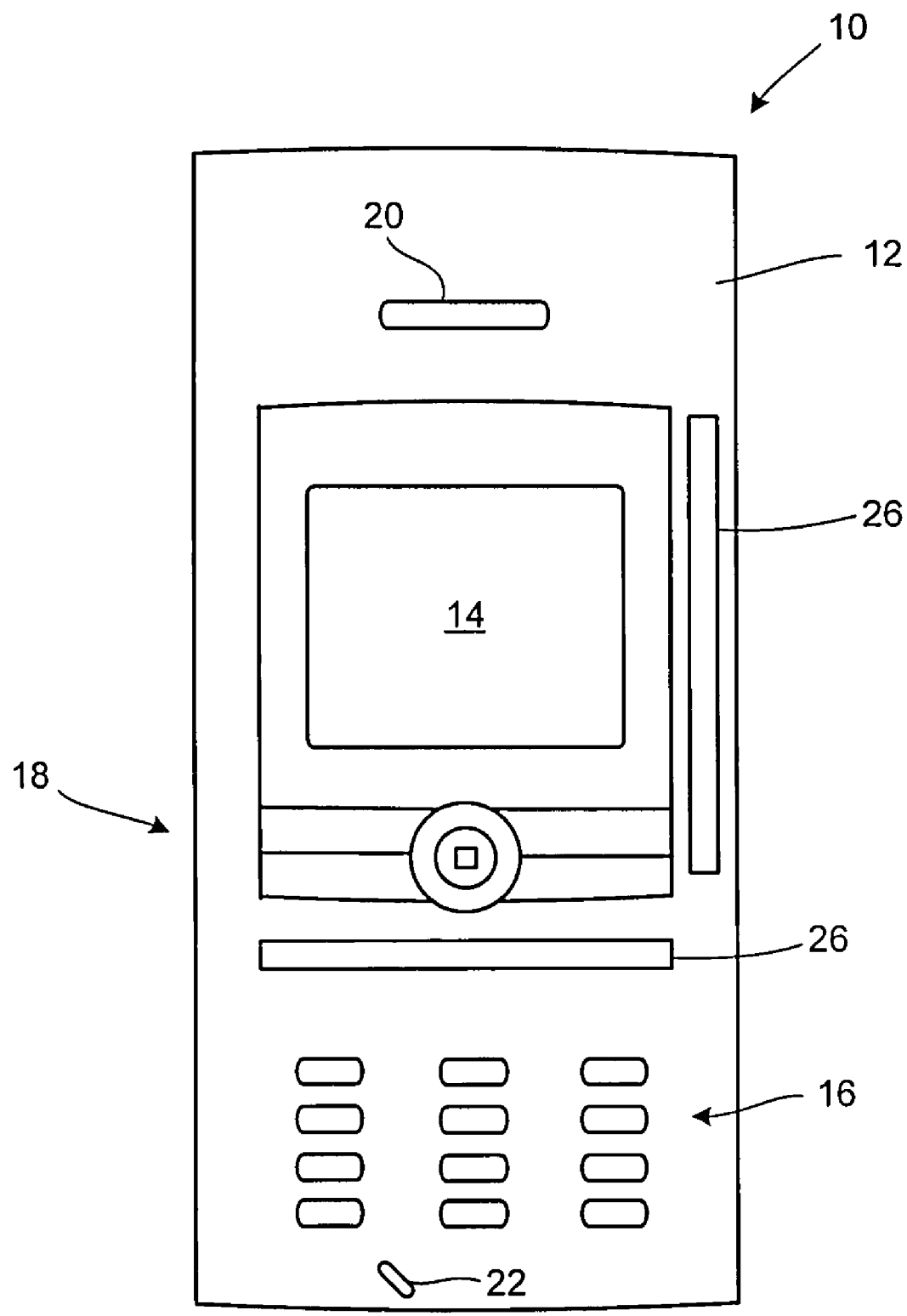
FIG. 1 is a diagrammatic illustration of an exemplary portable communication device on which aspects of the invention may be carried out.

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

Touch input devices, such as an electronically segmented copper strip or pressure-sensitive strip, have aesthetic and functional benefits. As is described more fully below, a touch strip may be electronically divided into segments where each segment contributes with a different signal level of detection.

One advantage of the use of a segmented touch input strip is that it can be configured to implement both key press functionality (also referred to as touch key functionality) and scrolling functionality on a common hardware component. However, the implementation of key press functionality and scrolling functionality may lend itself to more complex control firmware. The control code/circuitry may be more substantial and the interface towards the touch sense may have to be enhanced. This larger control code/circuitry may be limited by hardware parameters, such as memory, speed, CPU capacity and the like.

The present disclosure describes a portable communication device equipped with a touch input device having key press and scrolling functionality. The touch input device cooperates with an associated controller and is configured to provide benefits of touch input device hardware along with scrolling functionality. The touch input device is configured with grey zones separating adjacent key press detect areas to provide operation with existing control mechanisms, such that touch key benefits may be realized with existing coding of key press events.

As referred to herein, the term "portable communication device" includes portable radio communication equipment. The term "portable radio communication equipment", which herein after is referred to as a mobile phone, a mobile device, a mobile radio terminal or a mobile terminal, includes all electronic equipment, including, but not limited to, mobile telephones, pagers, communicators, i.e., electronic organizers, smartphones, personal digital assistants (PDAs), or the like. While the present invention is being discussed with respect to portable communication devices, it is to be appreciated that the invention is not intended to be limited to portable communication devices, and can be applied to any type of electronic equipment equipped with a touch input device.

Referring initially to FIG. 1, a portable communication device 10 is shown in accordance with the present invention. In the exemplary embodiment described herein, the portable communication device is a mobile phone 10. Of course, it will be appreciated that the present invention is applicable to other portable communication devices. The mobile phone 10 is shown as having a "block" type of housing 12, but it will be appreciated that other housing types, such as clamshell or slide-type housings may be utilized without departing from the scope of the present invention.

The mobile phone 10 includes a display 14, an alphanumeric keypad 16, one or more functional keys 18, e.g., a joystick or rocker key, a speaker 20 and a microphone 22. The alphanumeric keypad 16 and the functional keys 18, facilitate controlling operation of the mobile phone 10 by allowing for entry of alphanumeric information, such as telephone numbers, phone lists, contact information, notes and the like. The functional keys 18 typically facilitate navigation through various user menus including initiating and conducting phone calls and other communications. The display 14 displays information to a user, such as recorded digital media, e.g., recorded photos and videos, operating state, time, phone numbers, contact information and various navigational menus, which enable the user to utilize the various features of the mobile phone 10. Artisans will appreciate that the mobile phone 10 further includes suitable circuitry and software for performing various functionality. The circuitry and software of the mobile phone is coupled with input devices, such as the alphanumeric keypad 16, the functional keys 18 and the microphone 22, as well as to the output devices, including the display 14 and the speaker 20.

In the illustrated embodiment, the mobile phone 10 also includes one or more touch input devices 26, e.g., touch pads, touch strips or the like, disposed on or within the housing of the portable communication device ("on" or "within" may be used interchangeably in this regard). The touch input device is configured to provide key press functionality and scrolling functionality, e.g., display scrolling functionality, as well as other navigation functionality, while using existing software or other control circuitry. As is described more fully below, each touch input device 26 is configured to include a plurality of key press detect areas having enhanced boundaries, e.g., being separated by grey zones, to provide key press and scrolling functionality. It will be appreciated that the touch input device(s) 26 may have any suitable size, shape and positioning on or within the housing without departing from the scope of the present invention.

Figure 2:
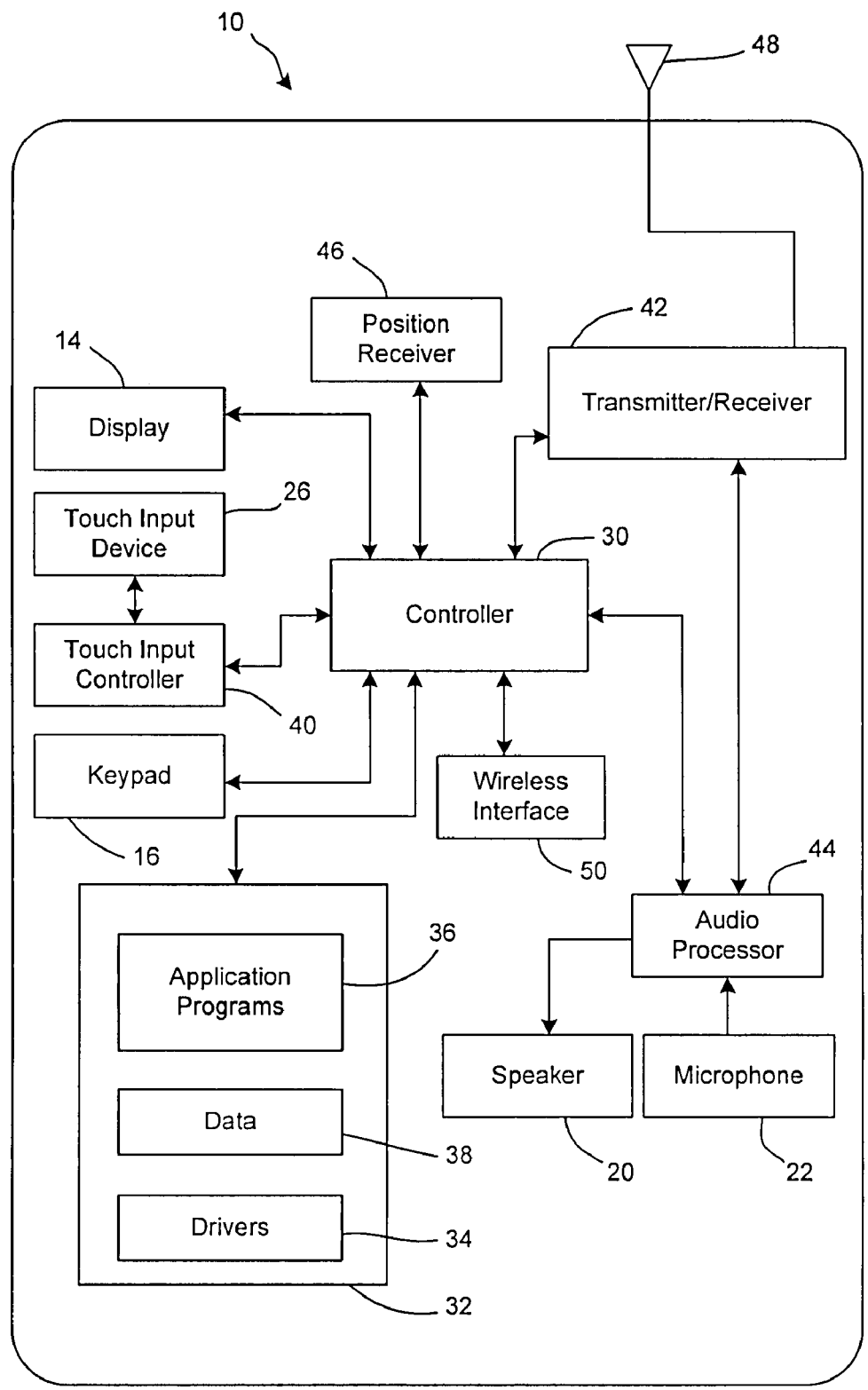
FIG. 2 is a diagrammatic illustration of a portable communication device.

FIG. 2 represents a functional block diagram of a portable communication device 10, e.g., a mobile phone. The portable communication device 10 includes a controller 30 that controls the overall operation of the portable communication device. The controller 30 may include any commercially available or custom microprocessor or microcontroller. Memory 32 is operatively connected to the controller 30 for storing control programs and data used by the portable communication device. The memory 32 is representative of the overall hierarchy of memory devices containing software and data used to implement the functionality of the portable communication device in accordance with one or more aspects described herein. The memory 32 may include, for example, RAM or other volatile solid-state memory, flash or other non-volatile solid-state memory, a magnetic storage medium such as a hard disk drive, a removable storage media, or other suitable storage means. In addition to handling voice communications, the portable communication device 10 may be configured to transmit, receive and process data, such as text messages (also known as short message service or SMS), electronic mail messages, multimedia messages (also known as MMS), image files, video files, audio files, ring tones, streaming audio, streaming video, data feeds (e.g., podcasts) and so forth.

In the illustrated embodiment, memory 32 stores drivers 34 (e.g., I/O device drivers), application programs 36, and application program data 38. The I/O device drivers include software routines that are accessed through the controller 30 (or by an operating system (not shown) stored in memory 32) by the application programs 36 to communicate with devices such as a display 14, a keypad 16 (e.g., a standard keypad, a QWERT keypad or a touch screen keypad), one or more touch input devices 26 (e.g., a pressure-sensitive touch pad), as well as other input/output ports. As is described more fully below, the touch input device is operatively coupled to and controlled by a touch input controller 40 (e.g., a suitable microcontroller or microprocessor) and configured to provide both key press (also referred to as touch key) functionality and scrolling functionality. As is described more fully below, the touch input controller 40 cooperates with the touch input device 26 to send "events" (e.g., press events and release events) to the controller based on detected user manipulation of the touch input device 26.

The application programs comprise programs that implement various features of the portable communication device 10, such as voice calls, e-mail, Internet access, multimedia messaging, contact manager and the like.

With continued reference to FIG. 2, the controller 30 interfaces with the aforementioned display 14, keypad 16 and touch input device(s) 26 (and any other user interface device(s)), a transmitter/receiver 42 (often referred to as a transceiver), audio processing circuitry, such as an audio processor 44, and a position determination element or position receiver 46, such as a global positioning system (GPS) receiver. The portable communication device 10 may include a media recorder (e.g., a still camera, a video camera, an audio recorder or the like) that captures digital pictures, audio and/or video. Image, audio and/or video files corresponding to the pictures, songs and/or video may be stored in memory 32.

An antenna 48 is coupled to the transmitter/receiver 42 such that the transmitter/receiver 42 transmits and receives signals via antenna 48, as is conventional. The portable communication device includes an audio processor 44 for processing the audio signals transmitted by and received from the transmitter/receiver. Coupled to the audio processor 44 are a speaker 20 and microphone 22, which enable a user to listen and speak via the portable communication device. Audio data may be passed to the audio processor 44 for playback to the user. The audio data may include, for example, audio data from an audio file stored in the memory 32 and retrieved by the controller 30 or audio data associated with a generated or received media-enhanced text message. The audio processor 44 may include any appropriate buffers, decoders, amplifiers and the like.

The portable communication device also may include one or more local wireless interfaces (indicated generally as wireless interface 50), such as an infrared transceiver and/or an RF adapter, e.g., a Bluetooth adapter, WLAN adapter, Ultra-Wideband (UWB) adapter and the like, for establishing communication with an accessory, a hands free adapter, e.g., a headset that may audibly output sound corresponding to audio data transferred from the portable communication device 10 to the adapter, another mobile radio terminal, a computer, or any other electronic device. Also, wireless interface 50 may be representative of an interface suitable for communication within a cellular network or other wireless wide-area network (WWAN).

Figure 3:
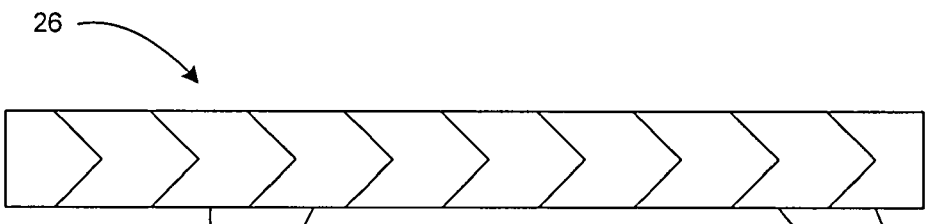
FIG. 3 is a diagrammatic illustration of an exemplary touch input device for use in connection with the present invention.
Figure 4:
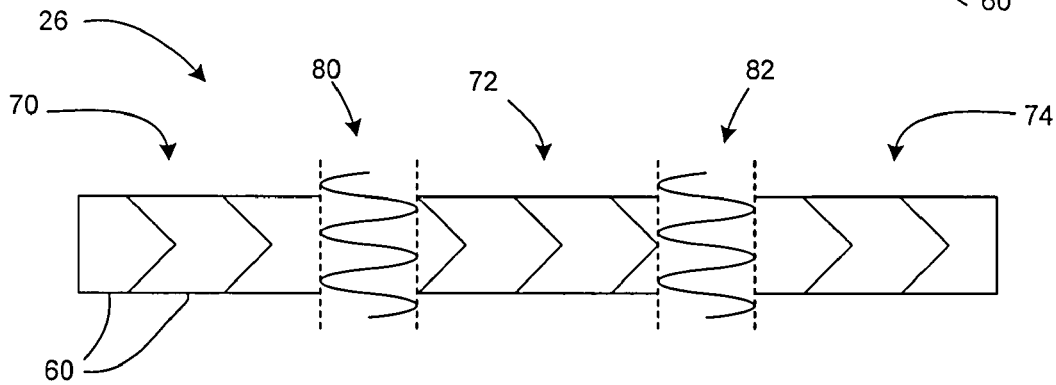
FIG. 4 is a diagrammatic illustration of an exemplary touch input device in which a plurality of key press areas and grey zone areas are defined.

Referring now to FIGS. 3 and 4, an exemplary touch input device 26 configured to provide key press and scrolling functionality is depicted. The touch input device 26 may be implemented using any suitable touch pad technology that is capable of detecting user manipulation of or contact with a portion of the touch input device. For example, the touch input device depicted in FIG. 3 and FIG. 4 is a touch input strip. Suitable touch input strips include, for example, pressure-sensitive touch pads or strips, copper pads or strips, capacitor touch pads or strips and the like. As shown in FIG. 3, the touch strip is electronically divided or otherwise segmented into a plurality of segments 60 along its length. It will be appreciated that the touch strip may be programmed or otherwise configured to include a variable number of segments depending, for example, on the overall dimension of the touch input device, as well as the desired sensitivity or resolution for touch detection. For example, a larger number of segments may be provided for a longer touch strip or for a touch strip having greater sensitivity or resolution. The touch input device 26 is configured such that each segment 60 contributes a different signal level is response to touch detection, where the signal level depends on the position of the strip that is touched or otherwise manipulated by the user of the portable communication device.

As shown in FIG. 4, the touch strip 26 is configured to have a plurality of keys 70, 72, 74 (also referred to as key press areas or key detect areas), with each key made up of a number of segments 60 (e.g., each key press area is electronically defined or programmed to include a predetermined group of segments). The individual keys 70, 72, 74 are separated by enhanced boundaries or grey zones 80, 82 (e.g., groups of segments disposed between adjacent key press areas, where the groups of segments are electronically defined to be boundaries between adjacent key press areas).

As is described more fully below, the use of a touch input device having electronically defined keys separated by grey zones facilitates use of a touch input device having touch key functionality along with scroll bar functionality all without having to implement enhanced control circuitry (e.g., enhanced software, firmware or circuitry to define a number of new events relating to the dual key press and scrolling functionality that is capable with the touch input device). Stated differently, the touch input device is configured to provide key press and scrolling functionality, while making use of previously-defined event commands, (e.g., a key press event or a key release event). With this configuration, the portable communication device may enjoy the benefits associated with a touch input device without requiring a substantial reworking or enhancement of software or control parameters to provide the dual key press and scrolling functionality.

It will be appreciated that the touch input device is operatively coupled to the touch input controller 40 (as well as other appropriate programs and the device controller 30). The touch input device (together with its associated control circuitry and/or control programs) is configured to generate key press and key release events in response to user touch or manipulation of the touch input device. The existing key press and key release events may be mapped to provide scrolling functionality in response to user manipulation of the touch input device.

A person having ordinary skill in the art of computer programming and/or circuit design, and specifically in applications programming for mobile phones, will consider it obvious in view of the provided description how to program a mobile phone to operate and carry out the functions described herein with respect to the key press and scrolling functionality provided by the touch input device (and any interfacing between the touch input device 26 and its associated touch input controller 40 and other application programs and/or control circuitry). Accordingly, details as to the specific programming code have been left out. Also, while the dual key press and scrolling functionality may be carried out by any suitable touch input device coupled to a suitable touch input controller touch input controller, such function also could be carried out via dedicated hardware, firmware, software or combinations thereof without departing from the scope of the present invention.

Figure 5:
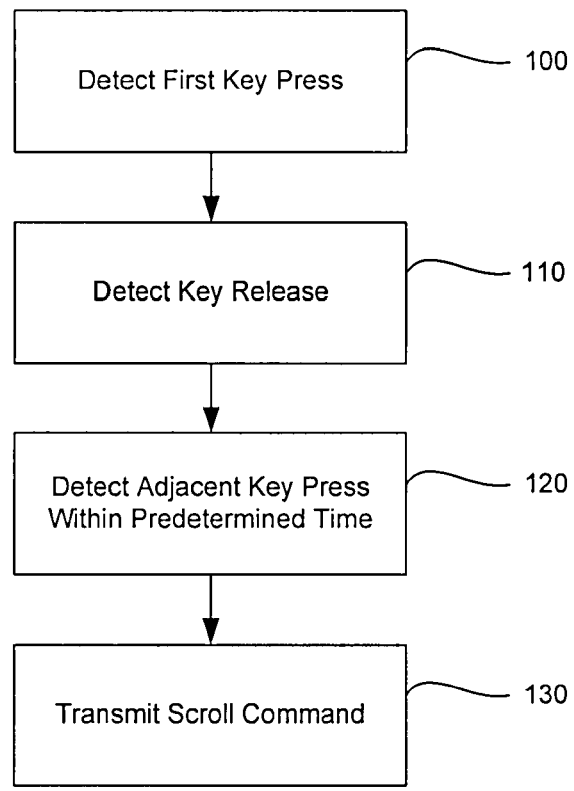
FIG. 5 is flow chart or functional diagram representing an exemplary embodiment of a method of scrolling a display of a portable communication device.
Figure 6:
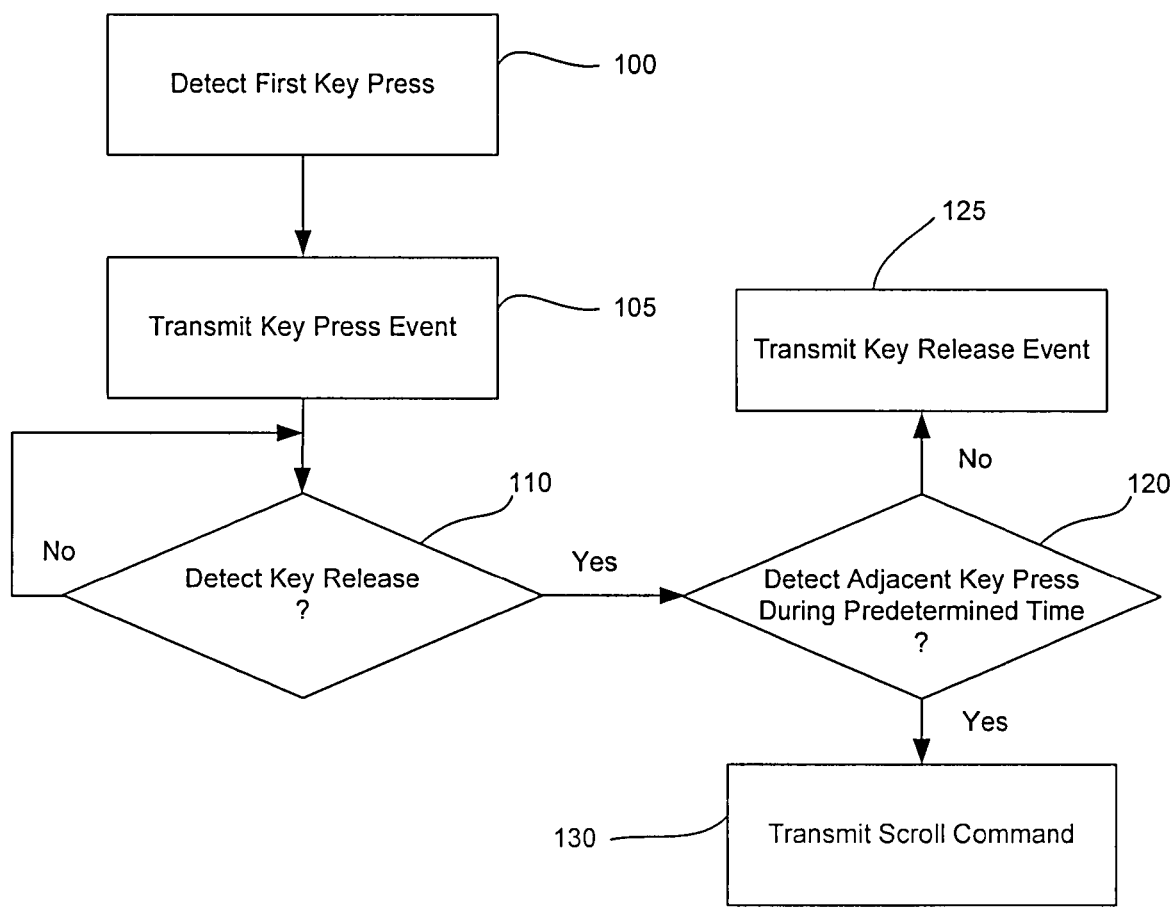
FIG. 6 is a flow chart or functional diagram representing another exemplary embodiment of a method of scrolling a display of a portable communication device.

While for purposes of simplicity of explanation, the flow charts or functional diagrams in FIGS. 5-6 include a series of steps or functional blocks that represent one or more aspects of the relevant operation of the portable communication device 10. It is to be understood and appreciated that aspects of the invention described herein are not limited to the order of steps or functional blocks, as some steps or functional blocks may, in accordance with aspects of the present invention occur in different orders and/or concurrently with other steps or functional blocks from that shown or described herein. Moreover, not all illustrated steps or functional blocks of aspects of relevant operation may be required to implement a methodology in accordance with an aspect of the invention. Furthermore, additional steps or functional blocks representative of aspects of relevant operation may be added without departing from the scope of the present invention.

The methodologies illustrated in FIGS. 5-6, which are implemented on or through a portable communication device, relate to a method of scrolling a display on a portable communication device in response to user contact with a touch input device. Turning now to FIG. 5, and with continued reference to FIG. 4, a method of scrolling a display on a portable communication device begins at functional block 100 where a first key press is detected. Detection of a first key press may include the generation and transmission of a key press signal in response to the user making contact with the touch input device in a first area, e.g., a first key press area. For purposes of explanation, detection of a first key press may include detection of user contact with one or more of the segments within the first key press area 70 (FIG. 4). At functional block 110, the portable communication device may detect a key release in the first key press area. As is described below, the detection of the first key release may be indicative of the user simply removing his/her finger from the first key press area. Alternatively, the detection of a key release in the first key press area may be indicative of a user sliding his/her finger across the touch input device with the intention of effecting a scroll of the display.

At functional block 120, the portable communication device detects an adjacent key press within a predetermined amount of time. For example, turning back to FIG. 4, if a user is sliding his/her finger across the touch input device, the touch input device may detect a first key press (e.g., in key press area 70), followed by a key release in area 70 (which corresponds to the user sliding his/her finger into the first grey zone 80). If within a predetermined amount of time, the portable communication device detects a key press in an adjacent key press area, (e.g., key press area 72) the portable communication device will interpret the sequence of events as a scroll movement by the user and, at functional block 130, transmit a scroll command to the controller to effect a scrolling of the display. It will be appreciated that the scrolling of this display may depend on the relative orientation of the touch input unit. For example, if the touch input unit is configured as a horizontal scroll bar, the touch input unit may transmit a horizontal left-to-right scroll command in response to detection of a user moving his/her finger from key press area 70, across grey zone 80, and into key press area 72. Alternatively, this sequence of events may be determined as an upward scroll or a downward scroll depending on the orientation of the touch input device.

The predetermined amount of time may be adjusted depending upon the type of portable communication device, and also may be user-configurable. In one exemplary embodiment, the predetermined period of time is about 200 milliseconds. Of course, the predetermined amount of time may be greater or less than 200 milliseconds without departing from the scope of the present invention.

Turning now to FIG. 6, a method of scrolling a display of a portable communication device begins at functional block 100 where a first key press is detected. As is described above, detection of a first key press may include generation of a key press signal in response to the user making contact with the touch input unit in a first area (e.g., in key press area 70). At functional block 105, the touch input unit (together with its associated microcontroller) may transmit a key press event to the main controller of the portable communication device.

The key press event may already be defined in the portable communication device, thereby reducing the amount of control software modification for implementation of the dual key press and scrolling functionality described herein. For example, in the case of a rocker or joystick navigation key, key press events typically already are coded into the control circuitry, such as transmitting a key press event if it is detected that the user manipulates the joystick to the right or left.

At functional block 110, the touch input device 26, together with its associated microcontroller 40, detects whether there has been a key release, that is, a detection of a user ending contact with the touch input device in the first key press area. Of course, if no key release has been detected, the portable communication device will not advance further any scrolling or key press functionality. At functional block 120, it is determined whether an adjacent key press is detected during a predetermined amount of time following the detected key release (functional block 110). If no adjacent key press is detected during the predetermined amount of time following the detection of the key release, the microcontroller associated with the touch input device may transmit a key release event to the controller 125, indicating that the contact and subsequent release of contact in the first key press area with simply the user initiating a key press. Alternatively, at functional block 130, if a key press is detected at an adjacent key press area during the predetermined amount of time, the microcontroller associated with the touch input device may transmit a scroll command to the controller, which is representative of the user's desire to scroll the display in a given direction.

Therefore, the methodology described herein allows for the benefits associated with a dual function touch input device (key press functionality as well as scrolling functionality) without having to substantially enhance or redesign the associated control circuitry. The provision of enhanced boundaries or grey zones between adjacent keys defined on the touch input device allows for a more clear definition on where a user may touch for a key detection to succeed. Further, the implementation of grey zones allows the scrolling functionality to be made relatively simple. Because touch keys have been implemented in the past, key press and key release events already are defined in the associated control circuitry. To use the scrolling function, the user's finger may slide over two key detect areas (e.g., crossing a grey zone). Touching the first key detect area provides for a key press, while sliding over the grey zone to the next key detect area provides for a key release event for the first key and a key press event for the second key. With the appropriate above-described timing and trigger, this sliding motion is indicative of the direction of the user's finger movements.

Because each key is coded with a value, the value is processed by the controller system and sent as an event. The provision of using appropriate existing values and mapping the existing values to the scroll function allows the implementation of a dual-function touch input device without substantial reworking of the control circuitry. When a scroll is detected (as is described in FIG. 5 and FIG. 6), the appropriate application or control circuitry already is configured for the events associated with conventional navigation keys, and, therefore, may act as if a navigation key has been pushed, (e.g., a short right push, or a left push or a long right or left push). In addition, depending on how long user contact is detected with the adjacent key press area, the device may transmit appropriate control command for a continuous or faster scroll.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A portable communication device comprising:
   a housing;
   a display disposed within the housing; and
   at least one touch input device disposed within the housing, the touch input device being operatively coupled to touch input device control circuitry, wherein the touch input device control circuitry cooperates with the touch input device to electrically define at least a first key press area and a second key press area on the touch key input device, wherein the first and second key press areas are separated by a grey zone, and wherein the touch input device control circuitry is configured to:
   detect a key press in the first key press area of the touch key input device;
   detect a key release in the first key press area, wherein detecting a release of contact in the first key press area includes detecting contact relative to the touch input device in the grey zone between the first and second key press areas;
   detect a key press in the second key press area adjacent to the first key press area; and
   transmit a scroll command if the key press in the second key press area is detected within a predetermined period of time relative to the key release in the first key press area.

2. The portable communication device according to claim 1, wherein the touch input device is a touch strip.

3. The portable communication device according to claim 1, wherein the touch input device control circuitry cooperates with the touch input device to define a first key press area, a second key press area and a third key press area on the touch key input device, wherein the first and second key press areas are separated by a first grey zone and the second and third key press areas are separated by a second grey zone.

4. The portable communication device according to claim 3, wherein the touch input device control circuitry is configured to detect a key press in a second key press area by detecting contact relative to the second key press area adjacent the grey zone.

5. The portable communication device according to claim 1, wherein the scroll command is operative to effect scrolling of an image on the display in a direction dependent on the position of the second key press area relative to the first key press area.

6. The portable communication device according to claim 5, wherein if the second key press area is disposed vertically above the first key press area, then the scroll command is operative to effect upward scrolling of the display.

7. The portable communication device according to claim 5, wherein if the second key press area is disposed vertically below the first key press area, then the scroll command is operative to effect downward scrolling of the display.

8. The portable communication device according to claim 5, wherein if the second key press area is disposed right of the first key press area, then the scroll command is operative to effect scrolling of the display to the right.

9. The portable communication device according to claim 5, wherein if the second key press area is disposed left of the first key press area, then the scroll command is operative to effect scrolling of the display to the left.

10. The portable communication device according to claim 1, wherein the touch input device is disposed on a front surface of the housing.

11. The portable communication device according to claim 1, wherein the touch input device is a strip disposed on a side surface of the housing.

12. The portable communication device according to claim 1, wherein the portable communication device is a mobile telephone.

13. A method of scrolling a display on a portable communication device, the portable device including a touch input device electronically segmented to include a first key press area and a second key press area on the touch input device, wherein the first and second key press areas are separated by a grey zone, the method comprising:
   detecting contact relative to a touch input device in a first key press area of the touch input device;
   detecting a release of contact in the first key press area, wherein detecting a release of contact in the first key press area includes detecting contact relative to the touch input device in the grey zone of the touch input device;
   detecting contact relative to the touch input device in a second key press area adjacent to the first key press area; and
   scrolling the display in a direction based on the relative position of the first key press area and the second key press area if contact with the second key press area is detected within a predetermined time relative to detecting release in the first key press area.

14. The method according to claim 13, further comprising:
   generating a first key press event command in response to detecting contact relative to a touch input device in a first key press area of the touch input device; and
   generating a first key release event command in response to detecting a release of contact in the first key press area.

15. The method according to claim 14, further comprising:
   generating a second key press event command in response to detecting contact relative to the touch input device in a second key press area adjacent to the first key press area; and
   generating a scroll command if detecting contact relative to the touch input device in the second key press area occurs within a predetermined time relative to detecting a release in the first key press area.

16. The method according to claim 13, wherein the portable communication device is a mobile telephone.

* * * * *